United States Patent [19]

Adelson et al.

[11] Patent Number: 5,354,979
[45] Date of Patent: Oct. 11, 1994

[54] METHOD AND DEVICE FOR STORING DATA

[76] Inventors: Alexander Adelson, Mountainside Trail, Cortlandt Manor, N.Y. 10566; Ira J. Schaefer, 107 Ridge Rd., Ardsley, N.Y. 10502

[21] Appl. No.: 856,779

[22] Filed: Mar. 24, 1992

[51] Int. Cl.$^5$ .................. G06K 19/06; G06K 7/10
[52] U.S. Cl. ..................... 235/491; 235/462
[58] Field of Search ............ 235/490, 491, 492, 383, 235/462

[56] References Cited

U.S. PATENT DOCUMENTS

| | | | |
|---|---|---|---|
| 4,403,869 | 9/1983 | Crutcher | 368/10 |
| 4,841,128 | 6/1989 | Gröttrup et al. | 235/491 |
| 4,978,840 | 12/1990 | Anegawa | 235/492 |
| 5,196,682 | 3/1993 | Englehardt | 235/491 |

FOREIGN PATENT DOCUMENTS 0202472  1/1990  Japan ................. 235/462

OTHER PUBLICATIONS

IBM Technical Disclosure Bulletin vol. 33, No. 7 Dec. 1990.

*Primary Examiner*—Donald Hajec
*Assistant Examiner*—T. N. Forbus, Jr.
*Attorney, Agent, or Firm*—Sprung Horn Kramer & Woods

[57] ABSTRACT

A method and device for storing data comprises a non-volatile memory for storing digital data words and a photoelectric transducer receptive of light energy applied thereto for producing an electric signal. The device is responsive to the electric signal for reading the stored digital data words out of the memory and for displaying the stored digital data words read out of the memory.

11 Claims, 5 Drawing Sheets

METHOD AND DEVICE FOR STORING DATA

BACKGROUND OF THE INVENTION

The present invention relates to a method and a device for storing data in a miniature portable package.

Known data devices for storing identification data such as bar codes, have the disadvantage that they normally store no more than a limited amount of information and that once data is stored thereon in the form of bars, it cannot be changed.

Other data storage devices such as magnetic strips, while being alterable, are not capable of storing more than a limited amount of information and require contact or near contact for data dialogue. Further, data storage devices that do not require contact, such as those that use rf, require stimulated transmitting schemes or on board batteries.

SUMMARY OF THE INVENTION

The main object of the present invention is to provide a device and a method for storing data which eliminates the disadvantages of the prior art.

The present invention is a portable wireless data or memory engine which can have fixed data stored therein or which can have data written into and read therefrom (random access).

There are many applications for such a device. For example, it can be used to log data about an item to which it is attached, such as a waste container, a piece of equipment, a patient in a hospital or the structural member of a bridge. It can also be used to identify a package in a warehouse, the ownership of a piece of equipment, or the medical history of a patient. Because the device can be powered remotely with strong light sources such as lasers, or constantly trickle charged with ambient light, it can be accessed from a distance.

These and other advantages of the present invention are achieved in accordance with the present invention by the method and device for storing data which comprises a non-volatile memory for storing digital data words, a photoelectric transducer receptive of light energy applied thereto for producing an electric signal, means responsive to the electric signal for reading the stored digital data words out of the memory and/or display means for displaying the stored digital data words read out of the memory.

The device also comprises energy storing means receptive of a powering portion of the electric signal for storing energy therefrom. The memory, the reading means and the display means are preferably energized solely by the electric signal and the energy storing means.

The device also comprises means for applying modulated light energy to the transducer to effect a modulation of the electric signal, means for demodulating the modulated electric signal to obtain digital data words therefrom and means responsive to the electric signal for writing digital data words into the memory. The means for writing into memory comprises means receptive of an entry code for enabling writing into memory and further comprising a bar code label or an equivalent code representation associated with the device and wherein the means for applying the modulated light energy includes means for reading the code, means for decoding the code to determine an entry code for the memory and means for modulating the light energy with the entry code. The means for applying the light energy preferably comprises a laser bar code scanner, a bar code wand or comparable code reader.

The display means preferably comprises at least one light emitting diode or a liquid crystal display which preferably has means for displaying the digital data words as bar codes, alphanumerics or graphics. The display can also be a silent alarm, a single alarm, or passive alarm or an event indicator.

The memory preferably comprises an EEPROM, a read only memory, a RAM or a shift register.

The device is preferably packaged in a thin planar housing in which the memory, transducer, reading means, energy storing means and display means are disposed with an exposed surface of the transducer and the display means at one main surface and an adhesive layer or suitable attachment means on the other main surface. The device also preferably comprises a transparent layer covering the exposed surfaces of the transducer and display means.

These and other features and advantages of the present invention will be disclosed and described hereinafter with reference to the attached drawings, wherein:

DETAILED DESCRIPTION OF THE INVENTION

Figure 1:
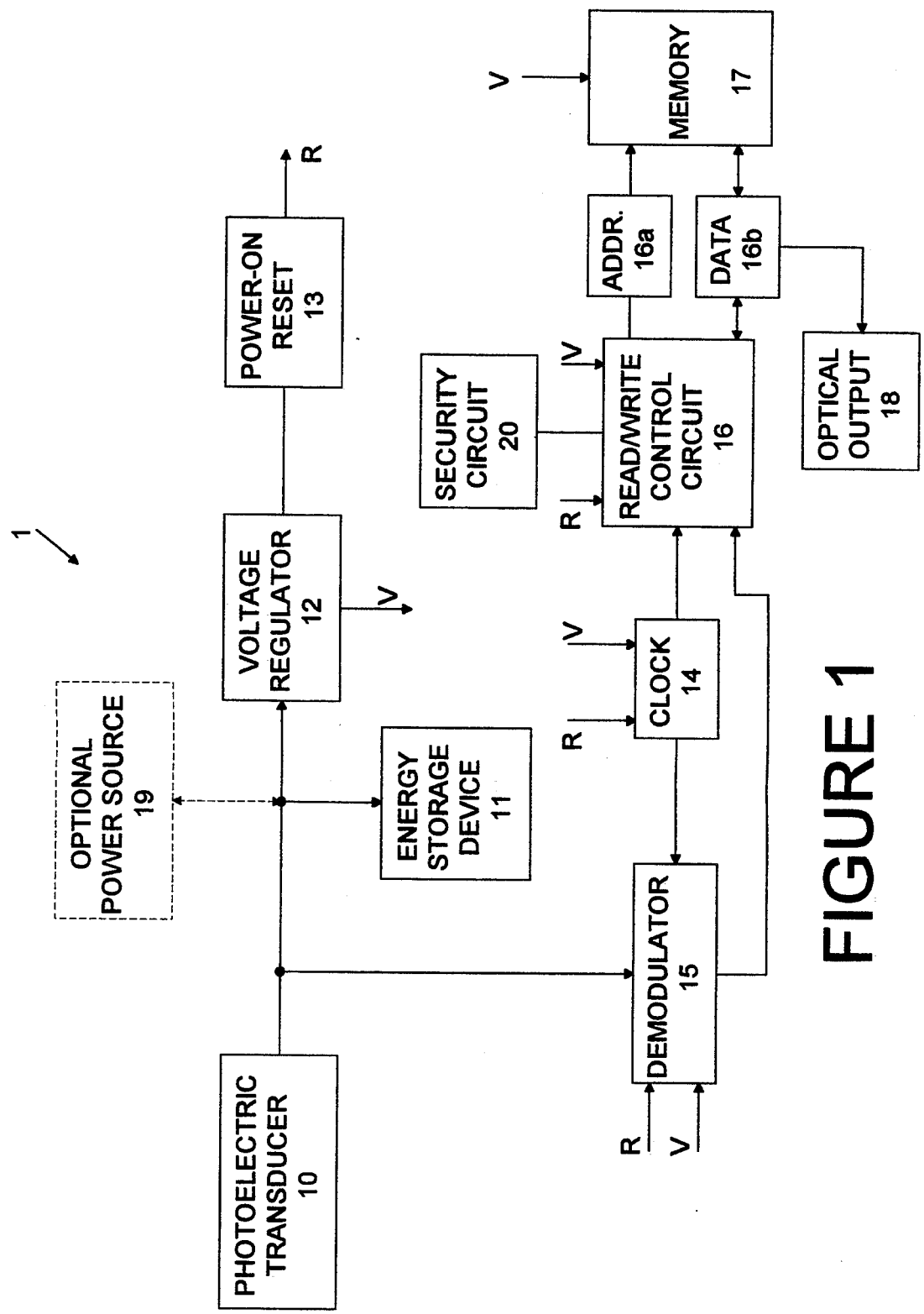
FIG. 1 is a block diagram of the device according to the present invention.

Referring now to FIG. 1, the device 1 for storing data includes a photoelectric transducer 10 which is receptive of light for converting the light energy into electrical energy for powering the device and has an output which produces an electrical signal corresponding to the incident light energy. The photoelectric transducer is preferably a photo diode, a photo voltaic cell, or photo transistor or can be an array thereof. The photoelectric transducer in accordance with the invention, depending upon the particular embodiment is a device which is capable of converting applied light including at least one of infrared, ultraviolet and visible light from at least one of incandescent, LED and laser light sources.

The output of the transducer 10 is fed to an energy storage device 11. In a preferred embodiment of the present invention the energy storage device is a capacitor which is capable of being charged by the electrical signal from the transducer. Alternatively, the device 11 can be a rechargeable battery or a thermochemical electric energy storage device.

The energy produced by the transducer 10 and the energy stored in device 11 is fed optionally to a voltage regulator 12 which is a conventional device for receiving a varying input signal and producing a constant voltage output V which is fed to the various components of the device as shown in FIG. 1. The regulator can be a zener diode. The output from the voltage regulator 12 is also fed to a power-on reset device 13 which, upon sensing the output voltage V at the output of regulator 12, produces a reset signal R which is fed to the various components of the device as shown in FIG. 1.

The device also includes a clock circuit 14 which receives the power-on reset signal R as well as the voltage V and is responsive to those two signals for generating a clock pulse at a predetermined frequency. The clock pulse is applied to demodulator 15 and read/write control circuit 16 as will be explained hereinafter.

A memory 17 is also provided which is preferably a non-volatile memory, that is, it maintains the data written into it even when power is removed from the circuit. The memory 17 can be any one of various conventional semiconductor memories such as a non-volatile bipolar RAM, an electronically erasable programmable read-only memory (EE-PROM) or a shift register. When the device is only utilized for reading data out of memory and not for writing into memory 17, the memory can be a conventional static semiconductor read-only memory (ROM).

Since the transducer output varies with the incident light energy, when the incident light is modulated, the resulting electrical signal will be modulated. Thus the incident light can be pulsed corresponding to digital data and the electrical signal will be a series of pulses.

The demodulator 15 also receives the electrical signal from the output of transducer 10 to demodulate any data modulated thereon. In the simplest case where there is no security and the transducer output signal is merely an edge or a pulse signifying that a pulse of light energy has been applied to the transducer 10, the demodulator 15 interprets this as a read inquiry and a signal is fed to the read/write control circuit 16 which then effects a read out of the data in the memory 17.

The read/write control circuit 16 includes an address register 16a and a data register 16b, both of which are reset upon power on. The address register 16a is preferably a counter which is incremented by a count of one for each pulse from demodulator 15. Thus, each word in the memory 17 can be addressed by successively pulsing the photoelectric transducer 10 which passes on a pulse to demodulator 15 and sends a read inquiry to the control circuit 16. The data in each successive address in memory 17 is applied to data register 16b which is then fed to an optical output or display 18.

In addition, the light applied to photoelectric transducer 10 can be modulated with digital data corresponding to data to be written into memory 17. A light source, such as a laser diode or light emitting diode can have its input modulated by any one of various conventional techniques so that the light energy output is modulated. The modulation can be digital modulation, pulse width modulation, analog frequency modulation or amplitude modulation. The photoelectric transducer creates an electrical signal proportional thereto and therefore, the electrical signal at its output is also modulated. The demodulator 15 extracts data from the signal including a predetermined code for the read/write control circuit 16 to indicate to the circuit 16 that data is to be written into memory, the address to be written into and the actual data to be stored.

The output device 18 is preferably a light emitting diode which can represent digital data by the on and off state thereof. Another preferred embodiment of the output device 18 is a liquid crystal display. The liquid crystal display can preferably display the data read out of memory 17 in the form of a bar code, alphanumerics or graphics.

In a particularly preferred embodiment of the present invention, all of the power utilized by the device 1 is obtained from light energy which is converted by the photoelectric transducer 10 into electrical energy. All of the energy contained in the energy storage device 11 is received from transducer 10. In this embodiment, the entire device 1 shuts down when no light is received by the transducer 10 or when the signal produced by the transducer 10 is insufficient to enable voltage regulator 12 to produce a voltage V. Since memory 17 is a non-volatile memory, the data will not be lost when the device is shut down. However, the entire device can be activated by applying incident light to the transducer 10 in sufficient amounts to produce the voltage V at the output of the regulator 12.

In an alternative embodiment, an optional power source 19 can be utilized such as a battery or another power supply.

In a further embodiment of the present invention, a security circuit 20 is attached to the read/write control circuit 16. Circuit 20 looks for a given code modulated into the light received by transducer 10 and demodulated by demodulator 15 which must be sent to the control circuit 16 in order to allow the read write control circuit 16 to either read data from memory or write data into memory 17.

Figure 2:
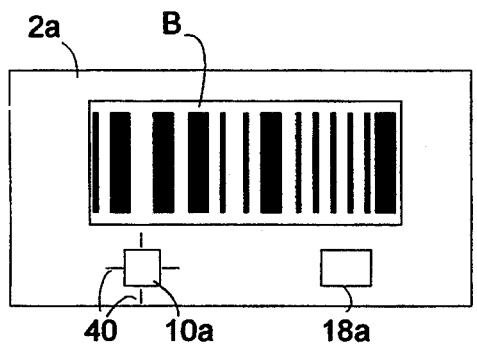
FIGS. 2-5 are top views of alternative packaging configurations of the device according to the present invention.
Figure 10A:
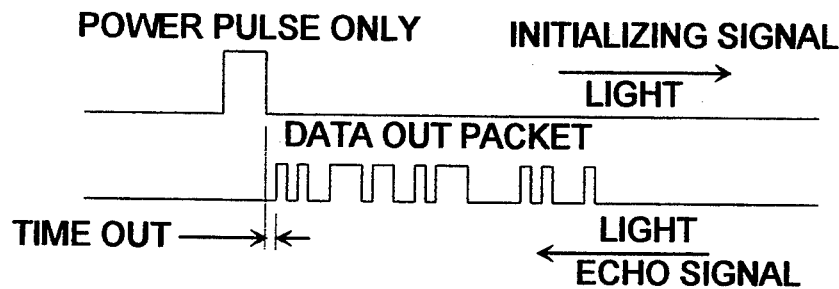
FIGS. 10A-C are signal diagrams of different embodiments of the device shown in FIG. 1.
Figure 10B:
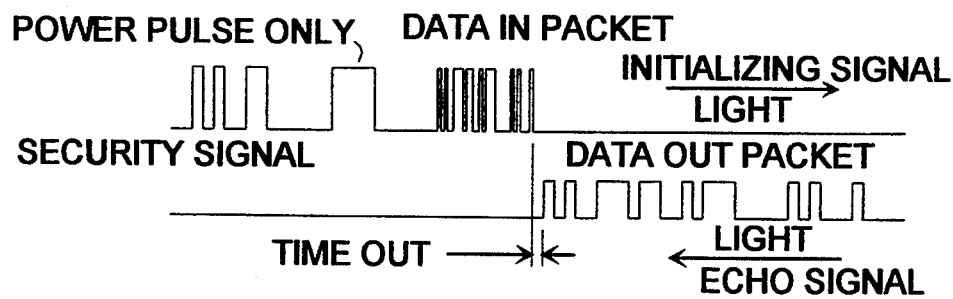
Figure 10C:
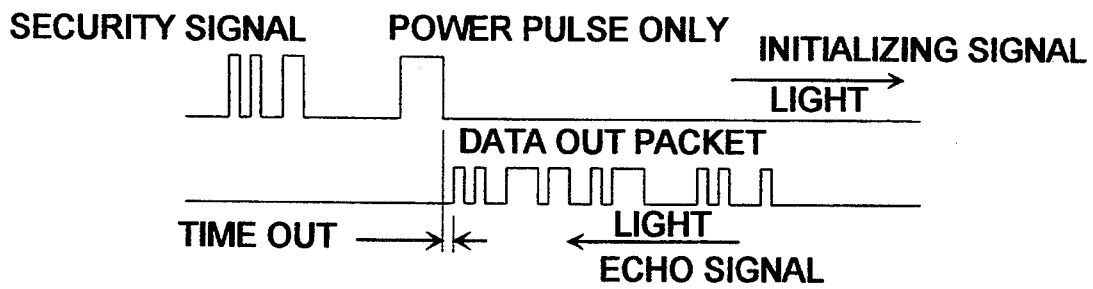

FIGS. 10A–10C are signal drawings for various embodiments of FIG. 2. In the case where data is only read out, the pulses of FIG. 10A are generated. The upper waveform is the light applied to transducer 10 and the lower waveform is the output of optical output 18 (when in the form of an LED).

In FIG. 10B a security code is first applied to transducer 10a before the power pulse so that security circuit 20 will permit writing of data into memory 17 and reading out of data. In FIG. 10C, the security signal is used to permit a user to read out data from memory 17.

While the device according to the present invention can be produced from discrete circuitry, middle scale integrated circuitry or large scale integrated circuitry, the preferred embodiment is the production of the device on a printed circuit board 22 using large scale integrated circuitry to produce a thin substantially planar package as shown in FIGS. 2–6.

In the embodiment shown in FIG. 2, the device 2a which has a preferable size of approximately 1"×2" includes a bar code label B on a main surface and bearing a bar code relating to the particular device. The transducer 10a has an exposed portion and the optical output is preferably an LED 18a having an exposed portion. In this embodiment, the bar code label B is an identifying label for the device. Transducer 10a also has indicia 40 forming an aiming target to enable a user to direct a beam of light at it from a distance.

Figure 3:
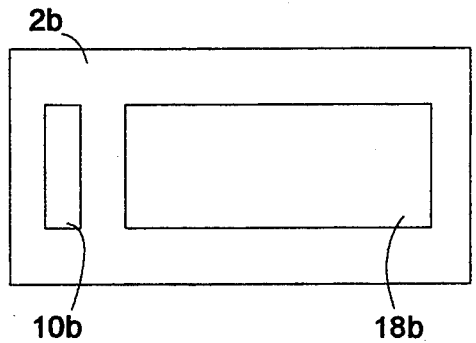
Figure 6:
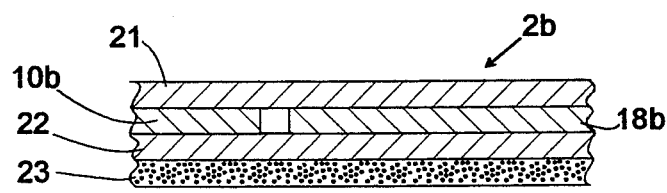
FIG. 6 is a sectional view of the package shown in FIG. 3.

In the alternative embodiment shown in FIG. 3, the device 2b has an array of transducers 10b having an exposed surface on the side of a liquid crystal display 18b having exposed area. As shown in FIG. 6, the exposed areas of the transducer and display are covered by a thin transparent film 21 so that a sealed and weatherproof package is obtained. The package may also include an adhesive backing 23 or another suitable fastener such as Velcro, to enable the device to be mounted at desired locations.

Figure 4:
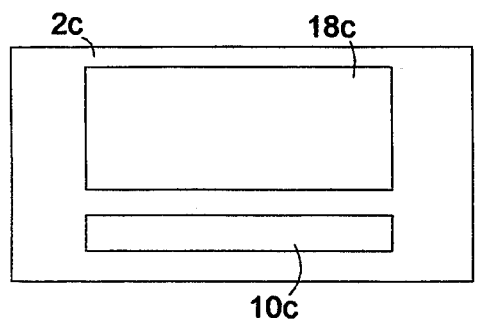

In the embodiment shown in FIG. 4, the device 2c has transducer 10c formed from an array with an exposed portion disposed beneath a liquid crystal output display 18c. The exposed portions are also preferably covered by a transparent laminated film.

Figure 5:
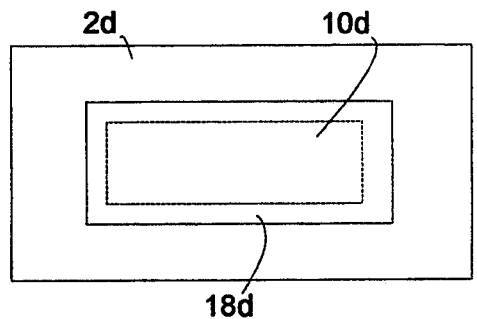

In the embodiment shown in FIG. 5, the liquid crystal display 18d is disposed in the center of device 2d and superimposed over an array of photoelectric transducers 10d and receiving light which passes through the liquid crystal display and falls on the transducer. This embodiment as well as that of FIG. 2, can also utilize the transparent film overlayer.

The device according to the present invention lends itself to be used with common bar code scanning equipment and the embodiments of FIGS. 2–5 can be used in the place of conventional bar code labels.

Figure 7:
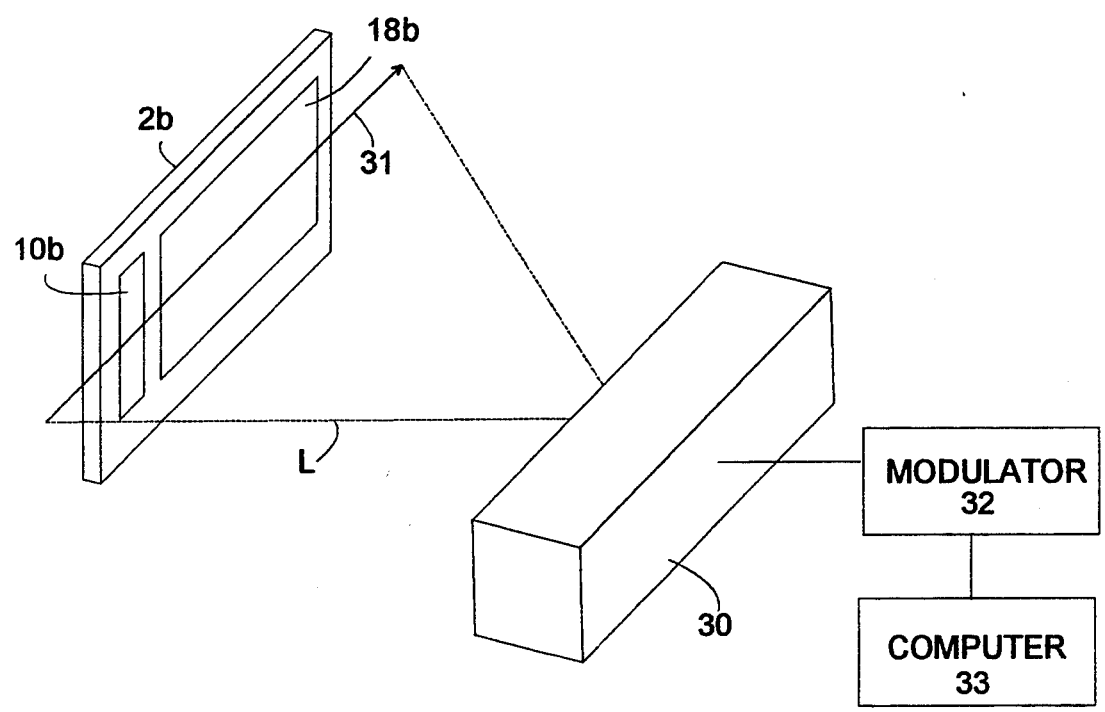
FIG. 7 shows the package of FIG. 3 in use.

For example, as shown in FIG. 7, a bar code scanner 30 using a laser scanning beam L, can scan across the face of device 2b. As the beam scans across the face of the device, laser light is applied to the transducer 10b which immediately produces electrical energy which activates the entire circuit 1 as described hereinbefore. In this instance, the single pulse of energy applied to the transducer causes the read/write control device 16 to increment the address register so that data in memory 17 at the first address is displayed in the liquid crystal display 18b. In a preferred embodiment where the display 18b displays the data in the form of a bar code, the bar code scanner 30 reads the data displayed in the form of a bar code on display 18b and this data is processed by the laser bar code reader 30 as it does any conventional bar code label. The bar code scanner 30 can be a stationary scanner or a hand held laser scanner.

It should be noted that in this manner, for each scan by the bar code scanner 30, the address register in the read/write control circuit 16 is incremented by 1 so that the entire contents of the memory 17 can be read out one word at a time and displayed on the liquid crystal display 18b for reading by the bar code reader 30. As a result, the device 2b becomes in effect a "scrollable" bar code label and thus the same label area that is normally used to hold a single bar code can hold a number of bar codes equal to the number of addresses in memory 17, i.e. from 16 to 1 million.

Figure 9:
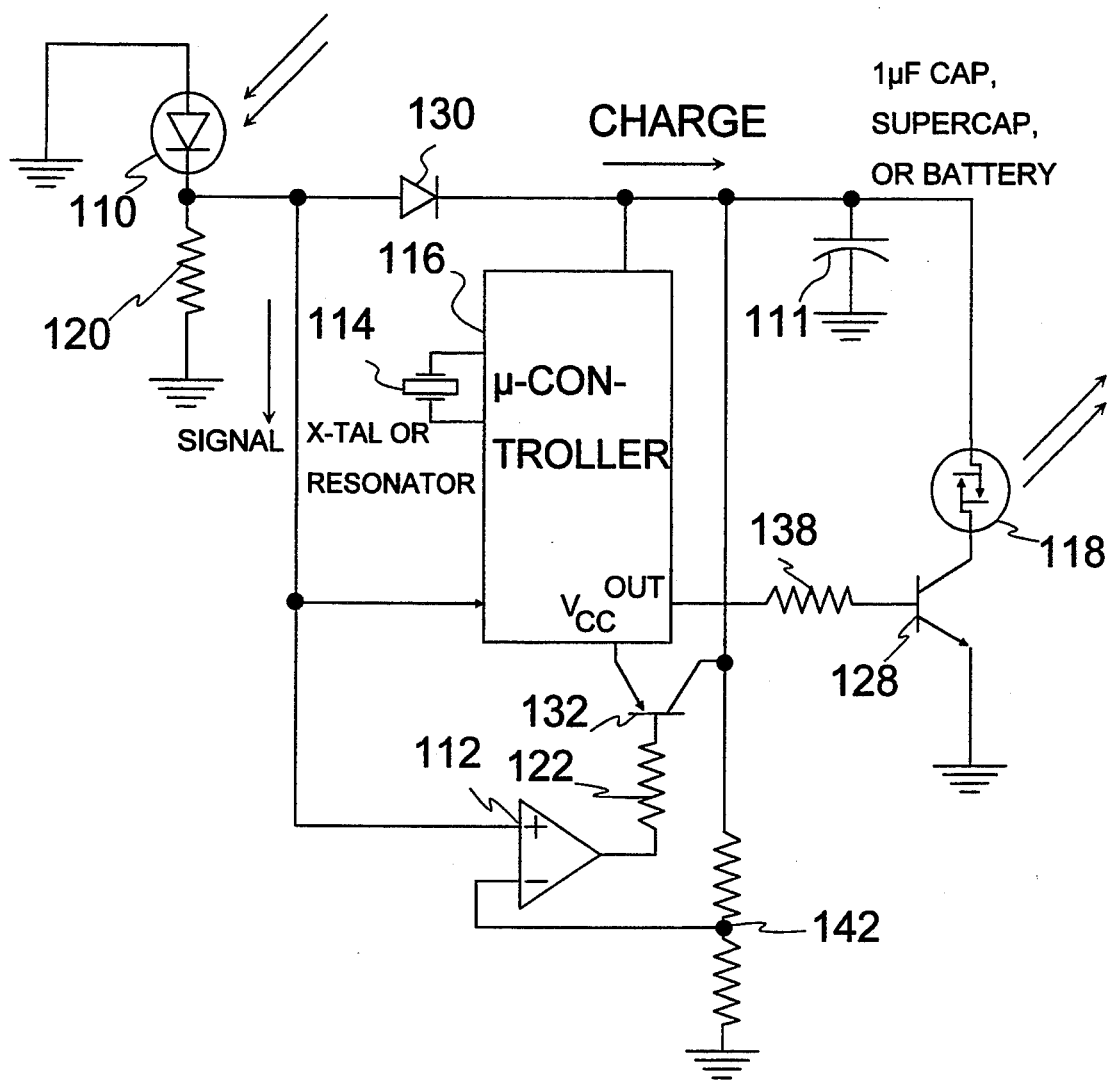
FIG. 9 is a circuit diagram of one embodiment of the invention.

FIG. 9 illustrates a circuit diagram of a simple implementation of the invention. In the circuit, a photodiode 110 is receptive of light and is connected to ground via resistor 120 to define a circuit signal which passes through diode 130 to charge 1 µf capacitor 111. The capacitor 111 can be a supercapacitor or a rechargeable battery.

The current signal from the diode 110 is also used as a power input to a voltage regulator comprising amplifier 112, resistor 122, transistor 132 and potentiometer 142. Moreover, the circuit signal from diode 110 is input to microprocessor 116 to act as a start pulse. The microprocessor 116 has a crystal or resonator 114 connected thereto to act as a clock generator and output data through resistor 138 and transistor 128 to light emitting diode 118. The LED 118 is able to blink with the data output from microprocessor 116, which can be read by a bar code wand or the like.

The system shown in FIG. 7 can also be utilized to write information into the memory. Data to be written into memory is sent by computer 33 to the modulator 32 which modulates the beam L emitted by the scanner 30. The modulated beam is applied to the transducer 10b along line 31 and written into memory in the manner set forth hereinabove.

Similarly, the package of FIG. 4 can be used with the laser bar code scanner by first scanning the transducer 10C and then reading the data output on the liquid crystal 18C.

The device shown in FIG. 5 can be read with a bar code scanner by incrementing the read write address register with every other scan so that the first scan is used to increment the read/write register to obtain the next address and display the data corresponding thereto and the second scan is used to read the data on the display.

Figure 8:
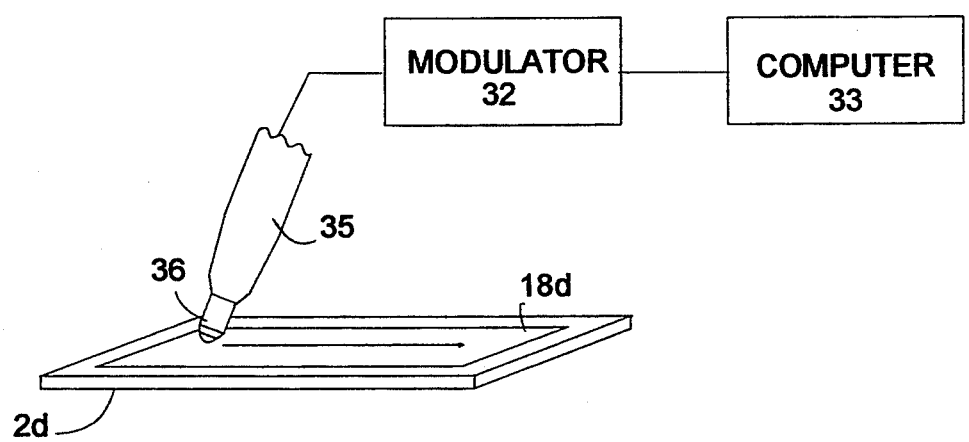
FIG. 8 shows the package of FIG. 5 in use.

The device according to the present invention can also be utilized with a wand 35 having a LED light emitter 36 as shown in FIG. 8.

In the embodiment shown in FIG. 8, the wand can be dragged across the package of FIG. 5 so that first the LED light source can be used to power up the device 2d by providing light energy to the transducer 10d and then the wand 35 can be used to read the displayed bar code on display 18d. If the wand is an OCR wand, the display 18d can display the data as alphanumerical which can be read by the user and by the wand.

When the wand is used with the package 2a shown in FIG. 2, the LED 36 can be placed in contact with transducer 10a for a time sufficient to enable the energy storage device to be fully charged. During that time a modulator 32 can modulate data from the computer 33 so that data can be written into the memory 17. The data that is to be outputted from memory 17 can be read by placing the wand 35 in contact with the LED 18a which is a blinking. The blinking LED simulates the output which would be read by dragging the wand along a bar code so that the computer 33 would decode it as if it was decoding the signals generated from reading a bar code.

As a result of the fact that data can be written into the device as well as read out of the device which displays the data in the form of a bar code, the device and the packaging shown in FIGS. 2–8 correspond to a "smart" bar code label which can be modified and which can hold vast amounts of information.

The ability to place the device on a person or mount it on apparatus, permits the user of the invention to distribute memory, so that data relating to a person or thing is located with or at the person or thing. In this way, the memory can be used to keep a list relating to the medical treatment of a person or keep track of the service on a piece of equipment which must be updated periodically or which must be accessed readily.

It is understood that other variations and improvements of the present invention can be utilized within the spirit and the scope of the present invention.

What is claimed is:

1. A data storage system comprising:
    (a) a housing containing:
        a memory for storing digital data words;
        photoelectric means receptive of light energy for producing an electric signal;
        memory control means responsive to the electric signal for sequentially reading data words out of the memory; and
        display means receptive of the data words sequentially read out of the memory for displaying each data word as a bar code; and
    (b) means for applying light energy to the photoelectric means for effecting the sequential reading of stored data words and including means for reading the bar codes displayed by the display means.

2. The system according to claim 1, wherein the memory comprises an EEPROM.

3. The system according to claim 1, wherein the memory comprises a read only memory.

4. The system according to claim 1, wherein the memory comprises a RAM.

5. The system according to claim 1, wherein the memory comprises a shift register.

6. The system according to claim 1, wherein the housing is thin and planar and has an exposed surface of the photoelectric means and the display means at one surface.

7. The device according to claim 6, further comprising an adhesive layer on another surface.

8. The device according to claim 6, further comprising a transparent layer covering the exposed surfaces.

9. A method for storing data comprising the steps of:
providing a memory in a housing having digital data words stored therein;
applying light energy to the housing and converting the light energy to an electrical signal;
sequentially reading out data words from the memory in response to the electric signal;
displaying each data word as a bar code on one surface of the housing; and
reading the displayed bar codes.

10. The method according to claim 9, wherein the steps of applying light energy and reading the displayed bar code comprise using a bar code scanner.

11. The method according to claim 10, wherein the steps of using a bar code scanner comprises using the same scanner for both applying light energy and reading the displayed bar codes.

* * * * *